United States Patent
Huang et al.

(10) Patent No.: US 10,501,092 B2
(45) Date of Patent: Dec. 10, 2019

(54) PROACTIVE HEALTH-BASED TRANSITION TO REDUNDANT SUBSYSTEMS

(71) Applicant: GM Global Technology Operations LLC, Detroit, MI (US)

(72) Inventors: Xiaoyu Huang, Troy, MI (US); Wen-Chiao Lin, Rochester Hills, MI (US); Shengbing Jiang, Rochester Hills, MI (US); Shiming Duan, Ann Arbor, MI (US); Youssef A. Ghoneim, Rochester, MI (US); Steven W. Holland, St. Clair, MI (US); Yilu Zhang, Northville, MI (US)

(73) Assignee: GM Global Technololgy Operations LLC, Detroit, MI (US)

( * ) Notice: Subject to any disclaimer, the term of this patent is extended or adjusted under 35 U.S.C. 154(b) by 280 days.

(21) Appl. No.: 15/725,930

(22) Filed: Oct. 5, 2017

(65) Prior Publication Data
US 2019/0106115 A1  Apr. 11, 2019

(51) Int. Cl.
*B60W 50/029* (2012.01)
*B60R 16/023* (2006.01)
*B60W 30/18* (2012.01)
*B60W 50/00* (2006.01)
*G05D 1/00* (2006.01)

(52) U.S. Cl.
CPC ....... *B60W 50/029* (2013.01); *B60R 16/0232* (2013.01); *B60W 30/18136* (2013.01); *B60W 50/0098* (2013.01); *G05D 1/0077* (2013.01); *B60W 2050/0297* (2013.01)

(58) Field of Classification Search
CPC ............ B60W 50/029; B60W 50/098; B60W 30/18136; B60W 2050/0297; B60W 50/02; B60W 20/50; G05D 1/0077; B60R 16/0232; B60R 16/02; B60G 2800/80; B60T 8/1881; F02D 2041/227; F16H 2061/1224
See application file for complete search history.

(56) References Cited

U.S. PATENT DOCUMENTS

2003/0158640 A1* 8/2003 Pillar ................... A62C 27/00
701/29.4
2004/0243287 A1* 12/2004 Yanaka ................. B60W 50/02
701/33.6

(Continued)

*Primary Examiner* — Jason Holloway
(74) *Attorney, Agent, or Firm* — Quinn IP Law

(57) ABSTRACT

A method proactively transitions performance of a functional operation from a primary subsystem to a secondary subsystem within a vehicle or other system having an electronic control unit (ECU). The method includes receiving health management information via the ECU when the primary subsystem is actively performing the functional operation within the system and the secondary subsystem operates in a standby mode, wherein the health information is indicative of a numeric state of health (SOH) of the primary subsystem. The method also includes comparing the numeric SOH to a calibrated non-zero threshold SOH, and then commanding, via the ECU, a transition of the performance of the functional operation to the secondary subsystem and placing the primary subsystem in the standby mode when the numeric SOH is less than the calibrated non-zero threshold SOH. A vehicle executes the method via the ECU.

20 Claims, 3 Drawing Sheets

(56) References Cited

U.S. PATENT DOCUMENTS

| | | | |
|---|---|---|---|
| 2008/0004840 A1* | 1/2008 | Pattipatti | G05B 23/0251 |
| | | | 702/183 |
| 2010/0017543 A1* | 1/2010 | Preston | B60R 25/00 |
| | | | 710/16 |
| 2013/0158755 A1* | 6/2013 | Tang | H01M 10/48 |
| | | | 701/22 |
| 2017/0161965 A1* | 6/2017 | Du | G06F 17/5009 |
| 2019/0241207 A1* | 8/2019 | Jeong | B60R 16/0231 |

* cited by examiner

PROACTIVE HEALTH-BASED TRANSITION TO REDUNDANT SUBSYSTEMS

INTRODUCTION

Electromechanical systems are often constructed from multiple interconnected subsystems. Each constituent subsystem performs a dedicated function. For example, a vehicle may include separate steering and braking subsystems, as well as subsystems in the form of fluid pumps, actuators, controllers, and sensors. In autonomously-controlled vehicles and other advanced technology systems, mission-critical subsystems may have at least one level of built-in functional redundancy, with a primary subsystem serving as a main subsystem and one or more secondary subsystems performing the functions of the primary subsystem in a backup mode in the event of a fault in the primary subsystem.

SUMMARY

A method is disclosed herein for proactively transitioning an operation from a primary subsystem to a secondary subsystem in a vehicle or other top-level system having built-in functional redundancy. The present approach relies on available health management information to determine a numeric state of health (SOH) of the various subsystems, with an electronic control unit (ECU) commanding operational transition from the primary subsystem to the secondary subsystem when the SOH of the primary subsystem degrades below a calibrated threshold SOH. The method is intended to enable proactive detection of potential health-based performance issues of the primary subsystem before such issues fully materialize into a failure mode. Using the present method, the ECU is also able execute a suitable control action that effectively provides a limited level of functionality suitable for directing the vehicle into a default operating state using the secondary subsystem, while potentially extending the remaining useful life of the primary and secondary subsystems.

An example embodiment of the disclosed method includes receiving health management information via the ECU when the primary subsystem is actively performing an operation and the secondary subsystem is in a backup or standby mode. The health information is indicative of the numeric SOH of the primary subsystem. The method also includes commanding transition of performance of the operation to the secondary subsystem and placement of the primary subsystem in the standby mode when the numeric SOH of the primary subsystem is less than the calibrated threshold SOH.

The vehicle may have structurally and functionally redundant subsystems, e.g., redundant braking systems, steering systems, or controllers, or the redundancy may be purely functional such as an example provided herein of using a braking system to perform a limited steering function. When structurally and functionally redundant subsystems are used, the secondary subsystem may be substantially undersized or otherwise configured to perform limited functions sufficient for placing the vehicle in a default shut-down mode, after which service or maintenance of the primary subsystem may be performed.

A vehicle is also disclosed herein that includes a primary subsystem, a redundant secondary subsystem, and an ECU in communication with the primary and secondary subsystems. The ECU is configured to execute the method noted above.

The above-noted and other features and advantages of the present disclosure, will be readily apparent from the following detailed description of the embodiment(s) and best mode(s) for carrying out the described disclosure when taken in connection with the accompanying drawings and appended claims.

Figure 1:
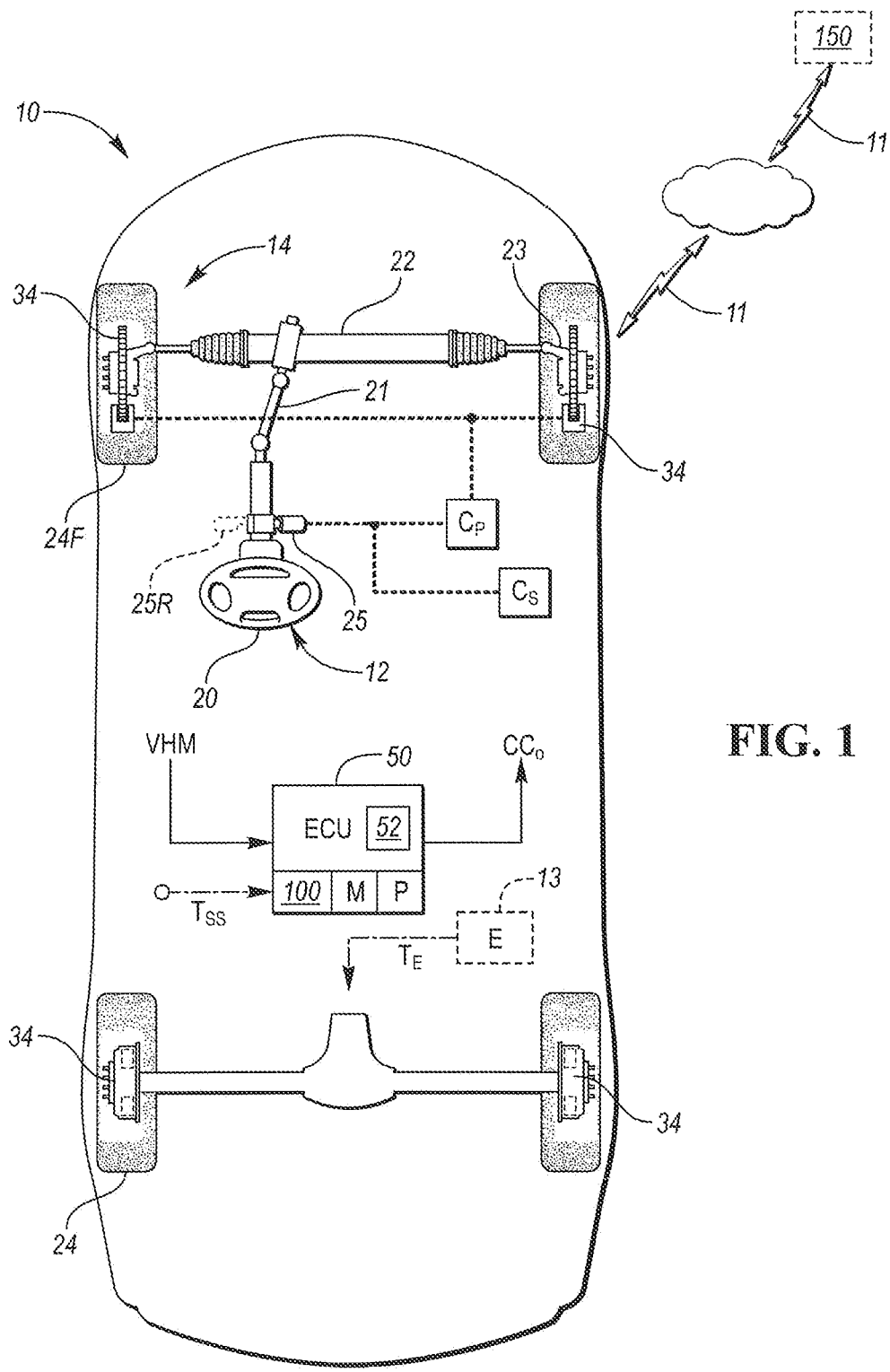
FIG. 1 is a schematic depiction of an example system in the form of an autonomous vehicle having an electronic control unit (ECU) configured to proactively transition a given operation to a redundant subsystem according to a method as described herein.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to like components throughout the several views, an example vehicle 10 is shown schematically in FIG. 1. The vehicle 10 includes a plurality of subsystems, shown for simplicity as an example steering system 12 and an example braking system 14. Other subsystems may include an optional internal combustion engine (E) 13 outputting an engine torque (arrow $T_E$) to a transmission (not shown), and controllers $C_P$ and $C_S$, such as motor control processors configured to regulate operation of a given electric machine or other component, and/or other targeted subsystems of the vehicle 10. The vehicle 10 also includes an electronic control unit (ECU) 50 that is programmed to proactively transition performance of a functional operation from a primary subsystem to a secondary subsystem according to a method 100, an example of which is provided below with reference to FIG. 3.

As part of the method 100, the ECU 50 receives vehicle health information (arrow VHM) as a set of diagnostic data, including a numeric state of health (SOH) of the steering system 12, the braking system 14, controllers $C_P$ and $C_S$ such as motor control processors configured to regulate operation of a given electric machine or other component, and/or other targeted subsystems of the vehicle 10. The vehicle health information (arrow VHM) may include other diagnostic data, such as a temperature of the primary and secondary subsystems being evaluated as part of the method 100, or a speed, electrical current/voltage, or other suitable factor. For example, subsystem temperature (arrow $T_{SS}$) of the primary and/or secondary subsystems may be measured via a temperature sensor 15 and reported to the ECU 50, or vibration or another anomaly may be measured via a vibration sensor.

In response to the received VHM information, the ECU 50 is configured to execute computer-readable instructions embodying the method 100. Execution of the method 100 proactively transitions a particular functional operation, e.g., steering, braking, computation, sensing, etc., from a primary subsystem to a secondary subsystem using the vehicle health management information (arrow VHM), including the numeric SOH, and thereafter placing the primary subsystem in a temporary backup or standby mode. Timing of such transitions may vary with the configuration of the vehicle 10, with different transitions and SOH degradation trajectories described below with reference to FIGS. 2A-C.

The redundant subsystems contemplated as part of the method 100 may be the same type of subsystem, e.g., two steering subsystems 12, two braking subsystems 14, or two controllers $C_P$ and $C_S$. In such an embodiment, the primary and secondary subsystems may be identically configured, or the secondary subsystem may be embodied as a smaller/lighter version of the primary subsystem offering limited as-needed functionality. Alternatively, different structural types of subsystems may be used, such as the steering subsystem 12 and the braking subsystem 14 in the example embodiment described below with reference to FIG. 4.

With respect to the example vehicle 10 shown in FIG. 1, the steering system 12 may be optionally embodied as a motor-assisted electronic rack-and-pinion steering system. The steering system 12 in such an embodiment includes a steering wheel 20 coupled to a rack 22 via a steering shaft 21. Distal ends of the rack 22 are coupled in turn to the front wheels 24F of the vehicle 10 via a set of tie rods 23. Although omitted for simplicity, within the rack 22 a set of teeth are in meshed engagement with mating teeth of a rotating pinion gear disposed on the steering column 21. As a steering angle is imparted to the steering shaft 21 via rotation of a steering wheel 20, the pinion gear translates along the rack 22 via engagement with the rack teeth. In turn, the translation moves the rack 22 and coupled front wheels 24F in a corresponding steering direction.

Rotation of the steering wheel 20 turns the front wheels 24F, with the manual steering torque applied to the steering wheel 20 by an operator assisted via a steering assist motor 25 or, in other embodiments, by a hydraulic steering pump. Two such steering assist motors 25 may be used in a redundant actuator configuration, i.e., with steering assist motors 25 and 25R, such that a degradation of the numeric SOH of the steering motor 25 acting as a primary subsystem results in automatic SOH-based transition to the redundant steering motor 25R as described herein.

The example braking system 14 may include a brake pedal (not shown) to which is applied a pedal force when an operator of the vehicle 10 wishes to slow or stop the vehicle 10, or such a force may be autonomously commanded. The pedal force may be increased and delivered to the corners of the vehicle 10, e.g., via a booster and brake master cylinder (not shown) or via a braking motor, and thereafter used to activate a set of brake actuators 34. In some embodiments, the braking operation of the vehicle 10 may be assisted via motor torque from an electric machine (not shown) to the front wheels 24F and/or rear wheels 24 of the vehicle 10 in a regenerative braking process, with energy from such a regenerative braking process used to generate electricity for storage or for powering various components aboard the vehicle 10.

Still referring to FIG. 1, the ECU 50 may be configured as one or more digital computers or microcomputers, and specially programmed to execute steps of the method 100, and to control operation of a targeted function via a set of control signals (arrow $CC_O$). That is, when controlling the braking function the ECU 50 may transmit the control signals (arrow $CC_O$) as a set of braking commands in the form of a requested braking force or pressure, or the control signals (arrow $CC_O$) may be steering control signals regulating an electrical parameter controlling operation of the steering motor 25. To that end, the ECU 50 is configured with sufficient hardware to perform the required logical and control processes of the method 100, i.e., with sufficient memory (M), a processor (P), and other hardware such as a high-speed clock, analog-to-digital and/or digital-to-analog circuitry, a timer, input/output circuitry and associated devices, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like.

The ECU 50 may be in communication via a telematics unit 52 with a remote device, e.g., a remote server 150 such as a cloud-connected maintenance or dealership server, with the remote connection indicated in FIG. 1 by arrows 11. The remote server 150 may collect and record, offline, the VHM information (arrow VHM) describing a numeric SOH of each of the subsystems of the vehicle 10, and possibly other vehicles 10 in a fleet. Thus, as part of ongoing diagnostics and prognostics of the vehicle 10, the steering and braking subsystems 12 and 14 and/or other subsystems may communicate with the ECU 50, e.g., over a low-voltage controller area network (CAN) bus, such that the ECU 50 is apprised of the SOH of the primary and secondary subsystems, and ultimately informs (or is informed by) the remote server 150 of the SOH information.

A calibrated new/properly functioning subsystem starts out with a numeric SOH of 1 or 100%. Over time, the SOH degrades toward 0/0% SOH due to age and use. Certain faults, temperatures, or operating conditions may speed SOH degradation, with various example trajectories shown in FIG. 2C. Therefore, as part of the method 100 the ECU 50 compares the numeric SOH to a calibrated non-zero threshold SOH, and then commands transition of an operation from the primary subsystem to a redundant secondary subsystem when the numeric SOH of the primary subsystem is less than the calibrated non-zero threshold SOH. The term "non-zero" as used herein means a predetermined SOH indicative of a degraded level of health or performance that still corresponds to a significant amount of remaining useful life, e.g., greater than about 0.2 or 20% of a calibrated new/properly functioning SOH in some embodiments. In other embodiments, the threshold SOH may be set to a higher level such as 0.6/60% to 0.8/80%, with the commanded operational transition between primary and secondary subsystems occurring multiple times as the SOH of the primary subsystem degrades over time. Such possibilities will now be explained with particular reference to FIGS. 2A-C.

Figure 2A:
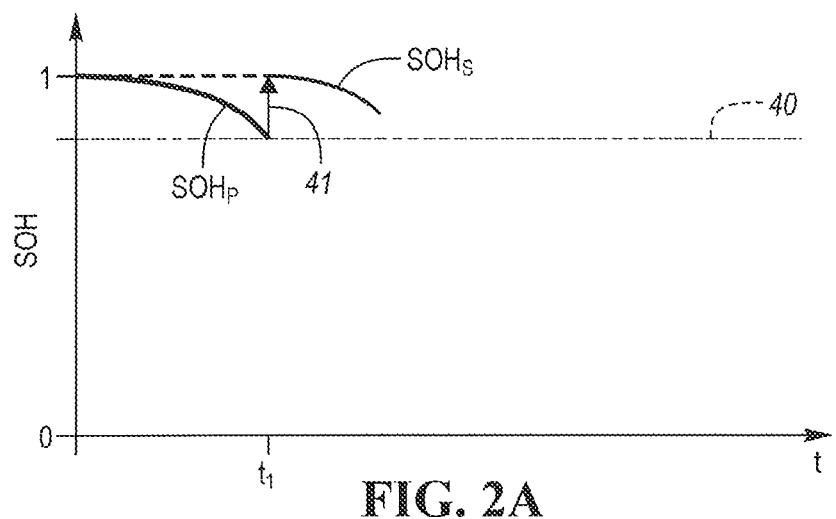
FIGS. 2A and 2B are representative time plots describing possible beneficial effects on state of health (SOH) degradation of a primary subsystem using the present approach.

Referring to FIG. 2A, the numeric SOH of representative subsystems of the vehicle 10 range from 1 to 0, with 1 (100%) representing a fully calibrated/properly functioning subsystem and 0 (0%) representing a failed subsystem, i.e., a subsystem having no remaining useful life. The method 100 includes establishing a suitable non-zero threshold SOH 40 for the primary subsystem. During operation of the vehicle 10, the numeric SOH of the primary subsystem, such as the example steering system 12 of FIG. 1, slowly degrades according to a trajectory $SOH_P$. As the degradation occurs, the ECU 50 of FIG. 1 operates the primary subsystem and maintains the redundant secondary subsystem in a backup or standby mode until the numeric SOH of the primary subsystem degrades below the threshold SOH 40.

When the threshold SOH 40 is reached, the ECU 50 commands the primary subsystem to turn off and enter a standby mode, and at the same time transitions operational control of the function to the redundant secondary subsystem. As shown in FIG. 2A, the numeric SOH of the secondary subsystem, $SOH_S$, is 1 at the moment of the transition, $t_1$, with the higher relative SOH indicated by arrow 41. The SOH of the primary subsystem, or $SOH_P$, is thus temporarily arrested at the level of the threshold SOH 40. After a set duration, at the onset of a subsequent drive cycle, or in response to another predetermined condition such as cooling to a threshold temperature of the primary subsystem, as determined via the temperature sensor 15 of FIG. 1, the ECU 50 may optionally transition operations back to the primary subsystem, or may toggle operation between the primary and secondary subsystems as depicted in FIG. 2B.

Figure 2B:
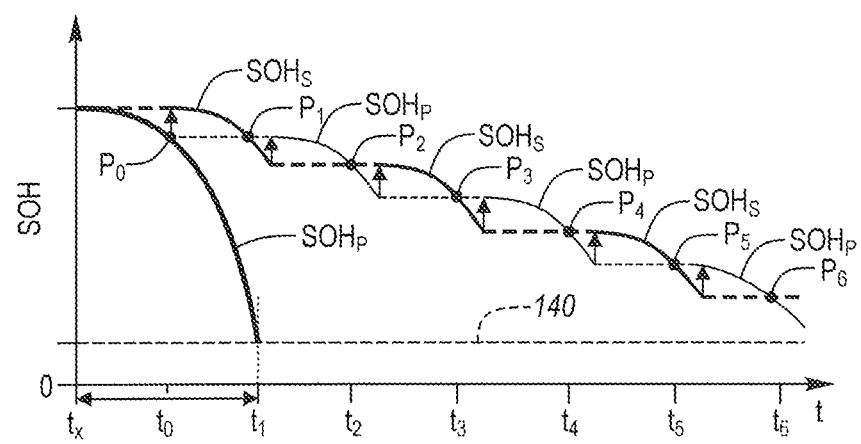

FIG. 2B in particular shows an example expected degradation of $SOH_P$ between $t_0$ and $t_1$. Absent the method 100, the primary subsystem would be permitted to degrade until a point failure, as represented by threshold SOH 140, at which point the ECU 50 would transition operations to the secondary subsystem in a type of "limp home" mode. Instead of awaiting failure of the primary subsystem, the option of FIG. 2B includes toggling or switching operation between the primary and secondary subsystems. For example, commencing at time $t_X$ and continuing until $t_0$, operation is performed by the primary subsystem with the secondary subsystem held in standby. At $t_0$, operation is transitioned to the secondary subsystem, i.e., at point $P_0$, and the numeric SOH of the secondary subsystem begins degrading. At $t_1$, the ECU 50 transitions operation back to the primary subsystem, the SOH of which is correspondingly higher that it ordinarily would have been at $t_1$ had the ECU 50 not proactively transitioned operational control to the secondary subsystem at $t_0$.

Similarly, the ECU 50 may switch from the primary subsystem to the secondary subsystem at points $P_2$, $P_4$, and $P_6$ corresponding to time $t_2$, $t_4$, and $t_6$, respectively, and from the secondary subsystem to the primary subsystem at points $P_3$ and $P_5$ and times $t_3$ and $t_5$, respectively. Eventually, by using the alternating approach of FIG. 2B the numeric SOH of the primary and secondary subsystems will degrade to the level of the threshold SOH 140, thereby requiring service or maintenance. However, this failure mode occurs much later in time, i.e., at $t_6$, relative to operation relying on the primary subsystem to failure at $t_1$. As noted above, the ECU 50 may time transition at points $P_1$-$P_6$ based on a calibrated duration and/or a condition such as temperature, for instance by allowing sufficient time for the primary subsystem to cool before resuming operations.

Figure 2C:
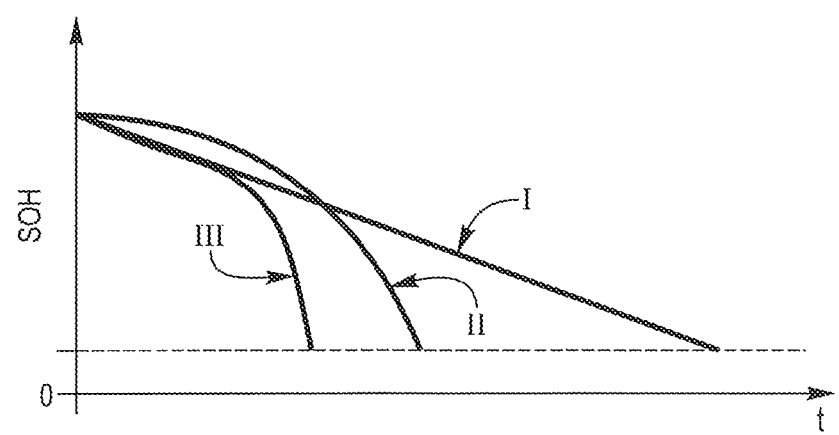
FIG. 2C is a time plot describing three possible degradation trajectories within the system of FIG. 1.

FIG. 2C depicts three possible example trajectories for degradation of the SOH of a given subsystem, i.e., linear degradation (type I), exponential degradation (type II), and linear+catastrophic degradation (type III). That is, while subsystems may degrade in a linear manner over time, in other subsystems the degradation may accelerate in response to increasing temperature, speed, or other factors. Proactive transition can avoid operation in regions in which the SOH tends to degrade rapidly. Other types of SOH degradation may be experienced, and thus FIG. 2C is intended to illustrate three common types without limitation. For type I/linear degradation, the applied thresholds within the scope of method 100 may be predetermined constants, e.g., 90%, 80%, 70%, etc. For type II/exponential degradation, a sample threshold SOH may be a maximum of a predetermined amount of the SOH of the secondary subsystem and the SOH of the primary subsystem, e.g., max [$0.9(SOH_S)$, $SOH_P$]. That is, when the SOH of the primary subsystem degrades below 90% of the SOH of the secondary subsystem, the ECU 50 may transition operation to the secondary subsystem. For type III degradation, the threshold SOH may be an estimated value of the SOH as the SOH exits the linear range and reaches a nonlinear region of the degradation curve indicated by III in FIG. 2C. Past performance of similar subsystems in other vehicles 10, e.g., in a fleet of autonomous or operator-driven vehicles 10, may be used to help establish the appropriate thresholds to use.

The physical configuration of the redundant subsystems may be considered by the ECU 50 in determining precisely when to transition operation from the primary subsystem to the secondary subsystem. One possible approach is the use of reduced-function secondary subsystems, such as, for the brake actuators 34 of FIG. 1, an additional small brake caliper and pad with a high friction surface but lower life expectancy than braking hardware used for the primary subsystem. The use of under-designed components for the redundant secondary subsystems may provide, by way of example, exceptional gripping/stopping force at the expense of a short expected life. However, such a compromise may enable the use of lighter structure and/or less expensive components due to the low expected frequency of use.

Such an asymmetric actuator, which may be of particular benefit in an autonomous vehicle implementation, could be powered by its own limited-function braking controller or the primary controller. In the example of the steering system 12, the redundant steering motor 25R may be smaller, due to the lower duty cycle envisioned for such a motor. Higher gear ratios may be used to boost forces that such smaller motor 25R could exert. As with the braking example, the redundant steering motor 25R may use a dedicated controller as the controller $C_S$ or rely on control via the primary controller $C_P$.

Figure 3:
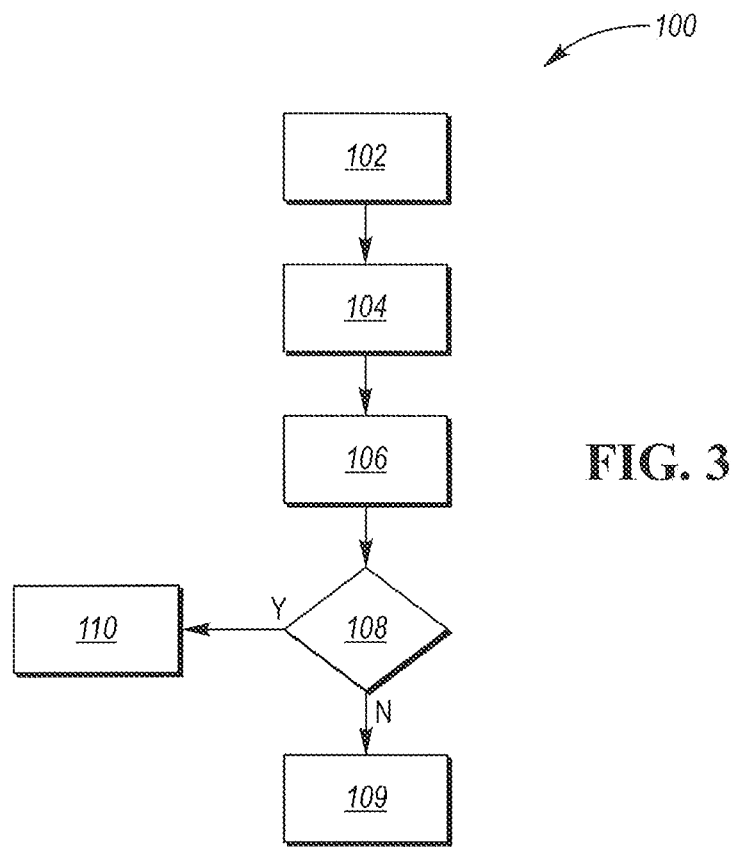
FIG. 3 is a flow chart describing a method for proactively transitioning a vehicle operation to a redundant subsystem aboard the example vehicle of FIG. 1.

Referring to FIG. 3, the method 100 in an example embodiment commences at block 102. The ECU 50 monitors the numeric SOH using the received vehicle health management information (arrow VHM). Calculation of the numeric SOH may be aboard the vehicle 10 using the ECU 50, or the remote server 150 may perform the calculations offline and relay the numeric SOH to the ECU 50 in different embodiments. The method 100 then proceeds to block 104.

At block 104, the ECU 50 identifies whether a given subsystem has degraded below a corresponding threshold SOH, e.g., the threshold SOH 40 of FIG. 2A, and registers associated failure modes if the SOH has degraded to the point of failure. As part of block 104, the ECU 50 may also determine the degradation trajectory or type, such as from among the three types I-III shown in FIG. 2C. The method 100 then proceeds to block 106.

Block 106 may entail obtaining the current status of a targeted primary and redundant secondary subsystem, e.g., the corresponding SOH, SOH gradient, time in service, etc. The method 100 then proceeds to block 108.

Block 108 includes determining whether predetermined exit conditions have been satisfied. Example exit conditions may include the corresponding SOH of the primary and secondary subsystems having dropped below a low threshold SOH indicative of an impending failure mode, or one of the subsystems has actually failed. The method 100 proceeds to block 110 if such exit conditions are satisfied. Otherwise, the method 100 proceeds to block 109.

Block 109 includes determining a transition point as a function of the type of degradation, the current SOH, the SOH gradient, service time, etc. That is, the ECU 50 of FIG. 1 is configured to determine the degradation trajectory for the numeric SOH of the primary subsystem, and to time the commanded transition in real-time using the determined degradation trajectory. The ECU 50 commands the transition via the control signals (arrow $CC_O$) at the determined transition point. Timing of the transition may also be based on attaining desirable operating conditions, such as timing transition to coincide with straight-line driving at low speed when transitioning to a secondary subsystem in the steering subsystem 12 or, for braking operations, ensuring that the vehicle 10 is cruising at a predetermined low speed, e.g., below 35 MPH. The method 100 is complete, possibly resuming with block 102 with control of the secondary subsystem.

Block 110, which is executed in response to a determination at block 108 that exit conditions are satisfied, may include continuing operation of the primary subsystem when possible depending on the SOH of the primary subsystem. Control actions executed by the ECU 50 at block 110 may also include sending an alert message or recording a diagnostic code, scheduling service of the vehicle 10, or calling for roadside assistance.

Figure 4:
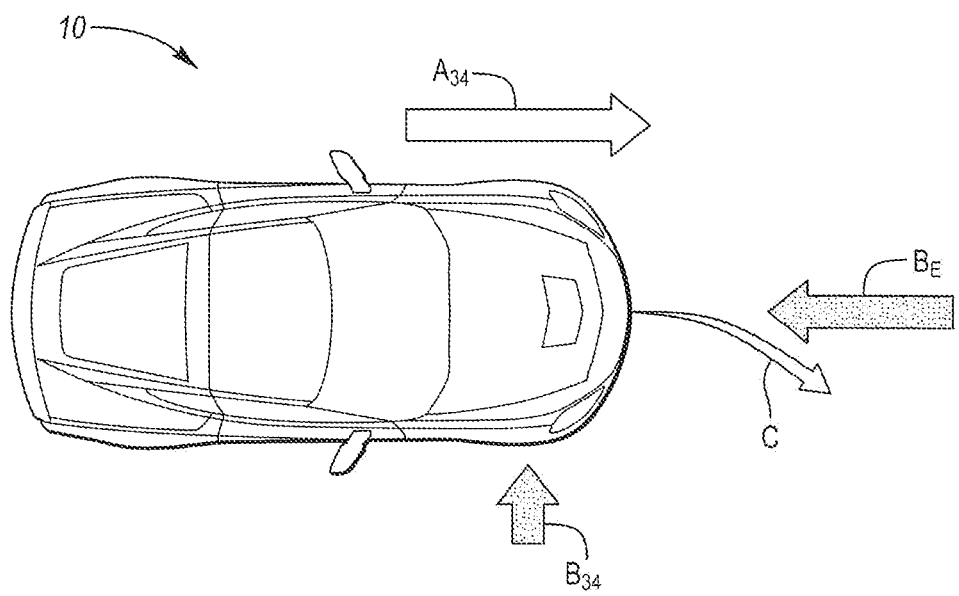
FIG. 4 is a schematic depiction of an example vehicle having primary and secondary subsystems in the form of respective steering and braking subsystems.

FIG. 4 depicts a non-limiting illustrative embodiment in which the primary and secondary subsystems have different primary functions. For example, the primary subsystem may be the steering subsystem 12 of FIG. 1 and the secondary subsystem may be the braking subsystem 14. Redundancy in this particular example refers to limited function afforded by transitioning to the secondary subsystem. The vehicle 10 may travel in a straight line at the moment the steering subsystem 12 degrades below a low threshold SOH, possibly indicative of impending failure of the steering motor 25. In response, when the vehicle 10 does not include the steering motor 25R of FIG. 1, the ECU 50 may transition steering operation to the braking system 14 by commanding application of a braking force (arrow $B_{34}$) to one front wheel 24F, which causes acceleration of the other front wheel 24F as indicated by arrow $A_{34}$. In turn, this action may cause the vehicle 10 to turn in the direction of arrow C. When an SOH-based failure mode occurs in the braking system 14, the ECU 50 may use limited functional redundancy in the form of engine braking, i.e., by commanding an engine braking force (arrow $B_E$) from the engine 13 of the vehicle 10 to help slow or stop the vehicle 10. Such a control action may be used concurrently with the braking system 12 to the extent sufficient SOH remains in the braking system 12.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for proactively transitioning performance of a functional operation from a primary subsystem to a secondary subsystem within a system having an electronic control unit (ECU) and the primary and secondary subsystems, the method comprising:
receiving health management information via the ECU when the primary subsystem is actively performing the functional operation within the system and the secondary subsystem operates in a standby mode, wherein the health information is indicative of a numeric state of health (SOH) of the primary subsystem;
comparing the numeric SOH to a calibrated non-zero threshold SOH; and
commanding, via the ECU, a transition of the performance of the functional operation to the secondary subsystem and placing the primary subsystem in the standby mode when the numeric SOH is less than the calibrated non-zero threshold SOH.

2. The method of claim 1, further comprising: commanding a transition of the performance of the functional operation back to the primary subsystem and placing the secondary subsystem back in the standby mode in response to a predetermined condition.

3. The method of claim 2, wherein the predetermined condition is a calibrated interval.

4. The method of claim 2, further comprising measuring a temperature of the primary subsystem using a temperature sensor, wherein the predetermined condition is the measured temperature of the primary subsystem.

5. The method of claim 2, wherein the primary and secondary subsystems are both steering subsystems, braking subsystems, or controllers.

6. The method of claim 1, wherein the primary subsystem and the secondary subsystem are a steering subsystem and a braking subsystem, respectively.

7. The method of claim 6, further comprising recording a diagnostic code indicative of a failed primary subsystem in response to the transition to the secondary subsystem.

8. The method of claim 1, wherein the system is a vehicle having an internal combustion engine, wherein the primary subsystem is a braking subsystem, the secondary subsystem is the engine, and commanding the transition of the performance of the functional operation to the secondary subsystem includes commanding engine braking.

9. The method of claim 1, wherein the calibrated non-zero threshold SOH is greater than about 0.2.

10. The method of claim 9, wherein the calibrated non-zero threshold SOH is about 0.6-0.8.

11. A vehicle comprising:
a primary subsystem;
a redundant secondary subsystem; and
an ECU in communication with the primary and secondary subsystems, wherein the ECU is configured to:
receive health management information when the primary subsystem is actively performing a functional operation within the vehicle and the secondary subsystem operates in a standby mode, the health information being indicative of a numeric state of health (SOH) of the primary subsystem;
compare the numeric SOH to a calibrated non-zero threshold SOH;
command a transition of the performance of the functional operation to the secondary subsystem and place the primary subsystem in the standby mode when the numeric SOH is less than the calibrated non-zero threshold SOH.

12. The vehicle of claim 11, wherein the ECU is further configured to command a transition of the performance of the functional operation back to the primary subsystem and place the secondary subsystem back in the standby mode in response to a predetermined condition.

13. The vehicle of claim 11, wherein the predetermined condition is a calibrated interval.

14. The vehicle of claim 11, further comprising a temperature sensor configured to measure a temperature of the primary subsystem, wherein the predetermined condition is the measured temperature of the primary subsystem.

15. The vehicle of claim 11, wherein the primary and secondary subsystems are both steering subsystems.

16. The vehicle of claim 11, wherein the primary and secondary subsystems are both braking subsystems.

17. The vehicle of claim 11, wherein the primary and secondary subsystems are both controllers.

18. The vehicle of claim 11, wherein the primary subsystem and the secondary subsystem are a steering subsystem and a braking subsystem, respectively, and wherein the ECU is further configured to record a diagnostic code indicative of a failure mode of the steering subsystem in response to the transition to the braking subsystem.

19. The vehicle of claim 11, wherein the vehicle includes an internal combustion engine, the primary subsystem is a braking subsystem, the secondary subsystem is the engine, and the ECU is configured to command the transition of the performance of the functional operation to the engine by commanding engine braking.

20. The vehicle of claim 11, wherein the ECU is configured to determine a degradation trajectory for the numeric SOH of the primary subsystems, and to time the commanded transition in real-time using the degradation trajectory.

* * * * *